United States Patent Office 3,149,031
Patented Sept. 15, 1964

---

3,149,031
NITROALKYL ESTERS OF HYDROCARBYL-CARBOXYLIC ACIDS AS FUNGICIDES
Paul J. Stoffel, St. Louis, and David J. Beaver, Richmond Heights, Mo., assignors to Monsanto Company, a corporation of Delaware
No Drawing. Filed June 1, 1961, Ser. No. 114,023
9 Claims. (Cl. 167—22)

This invention relates to novel fungicidal agents and is particularly directed to compositions and methods for the control of fungal organisms.

In accordance with this invention it has been found that upon application to fungal organisms and/or their horticultural habitats nitroalkyl esters of hydrocarbylcarboxylic acids effective control is obtained. The esters of this invention can be represented by the formula

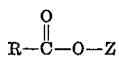

wherein R is a hydrocarbyl radical (i.e. a hydrocarbon radical) containing 1 to 17 carbon atoms and wherein Z is a nitro substituted alkyl radical containing 2 to 6 carbon atoms the nitro substituent of which being attached to a carbon atom at least one carbon atom removed from the carbonyloxy to which it is attached as indicated above.

As illustrative of Z but not limitative thereof are 2-nitroethyl, 2-nitropropyl, 2-nitrobutyl, 2-nitropentyl, 2-nitrohexyl, 3-nitropropyl, 3-nitrobutyl, 4-nitrobutyl, 5-nitropentyl, 6-nitrohexyl, etc., and the various isomeric and homologous forms thereof containing 2 to 6 carbon atoms the nitro substituent of which being attached to a carbon atom at least one carbon atom removed from the carbonyloxy group. In general it is preferred that Z be a 2-nitro substituted alkyl radical of the formula

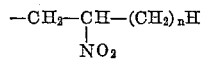

wherein $n$ is an integer from 0 to 3.

As illustrative of the hydrocarbyl radical R are the various aliphatic hydrocarbon radicals (both saturated and unsaturated), the various cycloaliphatic hydrocarbon radicals (both saturated and unsaturated), the various aromatic hydrocarbon radicals, the various partially hydrogenated polycyclic aromatic hydrocarbon radicals, the various bridged ring hydrocarbon radicals, etc., for example methyl, ethyl, propyl, butyl, pentyl, hexyl, heptyl, octyl, decyl, dodecyl, tetradecyl, heptadecyl, allyl, butenyl, heptadecenyl, propargyl, cyclobutyl, cyclopentyl, cyclohexyl, cyclopentenyl, cyclohexenyl, methylcyclopentyl, methylcyclohexyl, dicyclohexyl, phenyl, tolyl, xylyl cumyl, undecylphenyl, benzyl, phenethyl, phenpropyl, cinnamyl, dibenzyl, benzyphenyl, biphenylyl, naphthyl, tetrahydronaphthyl, anthracyl phenanthryl, indanyl, fluoroenyl, limonenyl, pinenyl, etc., and the various isomeric and homologous forms thereof containing up to 17 carbon atoms. Of this group of hydrocarbon radicals a preferred group are the primary alkyl radicals (both branched and straight chain) of the empirical formula $$H(C_mH_{2m})-CH_2-$$

wherein $m$ is an integer from 0 to 16, inclusive, and of this group the particularly preferred are the straight chain (or normal) alkyl radicals which can be represented by the empirical formula $H(CH_2)_x-$ wherein $x$ is a whole number from 1 to 17.

A number of the aforedescribed esters of this invention are new compounds and co-pending U.S. application Serial No. 114,022, filed of even date, claims as new compounds nitroalkyl trialkylacetates of the formula

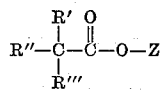

wherein Z has the aforedescribed significance and wherein R', R" and R''' are like or unlike alkyl radicals containing 1 to 3 carbon atoms (i.e. methyl, ethyl, propyl or isopropyl, but preferably methyl).

The esters of this invention can be prepared by reacting an acyl halide of the formula

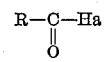

wherein R has the aforedescribed significance and wherein "Hal" means halogen of atomic number in the range of 16 to 36 (i.e. chlorine or bromine) with an alcohol of the formula ZOH wherein Z has the aforedescribed significance. While a wide range of reaction temperatures can be used provided the reaction system is fluid it is preferred to employ a reaction temperature in the range of from about 10° C. to about 120° C. Where and when desired an inert organic solvent can be employed, for example acetone.

As illustrative of the method of manufacture of the novel aliphatic esters of this invention but not limitative thereof is the following

Example I

To a suitable reaction vessel equipped with an agitator, thermometer and off-gas tube is added 18.2 parts by weight (substantially 0.2 mol) of 2-nitroethyl alcohol. At room temperature while agitating there is then added 24.1 parts by weight (substantially 0.2 mol) of trimethylacetyl chloride. While adding the chloride the temperature rose to 50-60° C., hydrogen chloride evolution accompanying the rise in temperature. Upon completion of the chloride addition the mass is heated at 60-70° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 71-72° C. at 0.4 mm. Hg is 2-nitroethyl trimethylacetate, an oil, $n_D^{25}$ 1.4286.

Analysis.—Theory 8.00% N; found 7.98% N.

Example II

Employing the procedure of Example I but replacing trimethylacetyl chloride with an equimolecular amount of triethylacetyl chloride there is obtained 2-nitroethyl triethylacetate.

Example III

To a suitable reaction vessel equipped with an agitator, thermometer and off-gas tube is added 21.0 parts by weight (substantially 0.2 mol) of 3-nitropropyl alcohol. At room temperature there is then added 24.1 parts by weight (substantially 0.2 mol) of trimethylacetyl chloride. While adding the chloride the temperature rose to 50° C., hydrogen chloride evolution accompanying the rise in temperature. Upon completion of the chloride addition the mass is heated at 50-60° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 80-83° C. at 0.3 mm. Hg is 3-nitropropyl trimethylacetate, an oil, $n_D^{25}$ 1.4324.

*Analysis.*—Theory 7.40% N; found 7.25% N.

Example IV

Employing the procedure of Example III but replacing 3-nitropropyl alcohol with an equimolecular amount of 2-nitro-n-propyl alcohol there is obtained 2-nitro-n-propyl trimethylacetate.

Example V

To a suitable reaction vessel equipped with an agitator, thermometer and off-gas tube is added 14.7 parts by weight (substantially 0.1 mol) of 6-nitrohexyl alcohol. At room temperature there is then added 12.1 parts by weight (substantially 0.1 mol) of trimethylacetyl chloride. While adding the chloride the temperature rose to 40–50° C., hydrogen chloride evolution accompanying the rise in temperature. Upon completion of the chloride addition the mass is heated at 60–70° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 120–125° C. at 0.7 mm. Hg is 6-nitrohexyl trimethylacetate, an oil, $n_D^{25}$ 1.4380.

*Analysis.*—Theory 6.06% N; found 5.83% N.

Example VI

Employing the procedure of Example V but replacing 6-nitrohexyl alcohol with an equimolar amount of 2-nitro-n-amyl alcohol there is obtained 2-nitro-n-amyl trimethylacetate.

Example VII

To a suitable reaction vessel equipped with an agitator, thermometer and off-gas tube is added 11.9 parts by weight (substantially 0.1 mol) of 4-nitrobutyl alcohol. At room temperature there is then added 12.1 parts by weight (substantially 0.1 mol) of trimethylacetyl chloride. While adding the chloride the temperature rose to 45° C., hydrogen chloride evolution accompanying the rise in temperature. Upon completion of the chloride addition the mass is heated at 70° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 67–71° C. at 2.0 mm. Hg is 4-nitrobutyl trimethylacetate, an oil, $n_D^{24}$ 1.4384.

*Analysis.*—Theory 6.9% N; found 6.8% N.

Example VIII

To a suitable reaction vessel equipped with an agitator, thermometer and off-gas tube is added 11.9 parts by weight (substantially 0.1 mol) of 1-methyl-2-nitro-n-propyl alcohol. At room temperature there is then added 12.1 parts by weight (substantially 0.1 mol) of trimethylacetyl chloride. While adding the chloride the temperature rose to 50° C., hydrogen chloride evolution accompanying the rise in temperature. Upon completion of the chloride addition the mass is heated at 60° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 74–75° C. at 0.9 mm. Hg is 1-methyl-2-nitro-n-propyl alcohol, an oil, $n_D^{25}$ 1.4255.

*Analysis.*—Theory 6.93% N; found 6.87% N.

Example IX

To a suitable reaction vessel equipped with an agitator, thermometer and off-gas tube is added 11.9 parts by weight (substantially 0.1 mol) of 2-methyl-2-nitro-n-propyl alcohol. At room temperature there is then added 12.1 parts by weight (substantially 0.1 mol) of trimethylacetyl chloride. While adding the chloride the temperature rose to 50° C., hydrogen chloride evolution accompanying the rise in temperature. Upon completion of the chloride addition the mass is heated at 60° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 73–75° C. at 1.0 mm. Hg is 2-methyl-2-nitro-n-propyl trimethylacetate, an oil.

*Analysis.*—Theory 6.93% N; found 7.10% N.

Example X

To a suitable reaction vessel equipped with an agitator, thermometer and off-gas tube is added 17.5 parts by weight (substantially 0.1 mol) of 1-propyl-2-nitro-n-butyl alcohol. At room temperature there is then added 12.1 parts by weight (substantially 0.1 mol) of trimethylacetyl chloride. While adding the chloride the temperature rose to 50° C., hydrogen chloride evolution accompanying the rise in temperature. Upon completion of the chloride addition the mass is heated at 60° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 96–102° C. at 13. mm. Hg. is 1-propyl-2-nitro-n-butyl trimethylacetate, an oil, $n_D^{25}$ 1.4384.

*Analysis.*—Theory 5.41% N; found 5.51% N.

Example XI

To a suitable reaction vessel equipped with an agitator, thermometer and off-gas tube is added 23.8 parts by weight (substantially 0.2 mol) of 2-nitro-n-butyl alcohol. At room temperature there is then added 24.1 parts by weight (substantially 0.2 mol) of trimethylacetyl chloride. While adding the chloride the temperature rose to 50° C., hydrogen chloride evolution accompanying the rise in temperature. Upon completion of the chloride addition the mass is heated at 70° C. for 4 hours. The reaction mass is then taken up with 50 parts by weight of diethylether, and the mixture washed with water and thereafter the so-washed mass dried over anhydrous calcium chloride. The so-dried organic solution is then fractionally distilled and the fraction collected at 90–92° C. at 1.4 mm. Hg. is 2-nitro-n-butyl trimethylacetate, an oil, $n_D^{25}$ 1.4275.

*Analysis.*—Theory 6.93% N; found 6.94% N.

Example XII

Employing the procedure of Example XI but replacing trimethylacetyl chloride with an equimolecular amount of triethylacetyl bromide there is obtained 2-nitro-n-butyl triethylacetate.

Example XIII

To a suitable reaction vessel equipped with an agitator, thermometer and off-gas tube is added 11.9 parts by weight (substantially 0.1 mol) of 2-nitro-n-butyl alcohol. At about 25° C. there is then added dropwise 30.3 parts by weight (substantially 0.1 mol) of stearoyl chloride. While adding the chloride the temperature rises to 50° C., hydrogen chloride evolution accompanying the rise in temperature. Upon completion of the chloride addition the reaction mass is heated at 60–70° C. for 4 hours. The reaction mass is then taken up with about 80 parts by weight of diethyl ether, and the mixture washed with water and then dried over anhydrous calcium chloride. The so-dried mixture is then evaporated under vacuum. The solid residue is then recrystallized from heptane yielding 2-nitro-n-butyl stearate, a colorless solid melting at 38–40° C.

Example XIV

Employing the procedure of Example XIII but replacing stearoyl chloride with an equimolecular amount of palmitoyl chloride there is obtained as a waxy solid 2-nitro-n-butyl palmitate.

Example XV

Employing the procedure of Example XI but replacing trimethylacetyl chloride with an equimolecular amount of n-heptanoyl chloride there is obtained 2-nitro-n-butyl n-heptanoate, an oil boiling at 113–115° C. at 0.7 mm. Hg.

Employing the procedure of Example XI but employing the appropriate acid chloride and the appropriate alcohol (i.e. ZOH) the following oils are obtained:

2-nitro-n-butyl oleate.
2-nitro-n-butyl 2-methyl-n-butyrate ___ 94–95° C./0.2 mm. Hg.
2-nitro-n-butyl 2-methylcrotonate _____ 104–105° C./ 0.05 mm. Hg.
2-nitro-n-butyl 4-methylbenzoate _____ 152–155° C./0.6 mm. Hg.
2-nitro-n-butyl but-3-enoate _____ 104–106° C./0.7 mm. Hg.
2-nitro-n-butyl diphenylacetate.
2-nitro-n-butyl 2-naphtylacetate.
2-nitroethyl propionate _____ 67.5–68.5° C./ 0.3 mm. Hg.
2-nitroethyl n-hexanoate _____ 89–90° C./0.3 mm. Hg.
1-n-propyl-2-nitro-n-pentyl propionate _ 97–100° C./0.7 mm. Hg.
1-n-propyl-2-nitro-n-pentyl n-hexanoate 134–136° C./1.5 mm. Hg.
2-nitro-n-butyl isobutyrate _____ 89–91° C./2.2 mm. Hg.
2-nitro-n-butyl 1-napthoate.
1-methyl-2-nitro-n-propyl propionate __ 79–81° C./2.2 mm. Hg.
3-nitro-n-propyl propionate _____ 89–93° C./1.3 mm. Hg.
3-nitro-n-propyl n-hexanoate _____ 130–133° C./3.0 mm. Hg.
6-nitro-n-hexyl n-hexanoate _____ 130–140° C./0.7 mm. Hg.
2-nitro-n-butyl acetate _____ 75–76° C./1.9 mm. Hg.
2-nitro-n-butyl propionate _____ 82–83° C./1.3 mm. Hg.
2-nitro-n-butyl cyclohexanoate _____ 128–129° C./1.5 mm. Hg.
2-nitro-n-butyl benzoate _____ 141–143° C./1.6 mm. Hg.
2-nitro-n-butyl n-pentanoate _____ 140–144° C./1.8 mm. Hg.
2-nitro-n-butyl n-decanoate.
2-nitro-n-butyl myristate.

The following oils are also illustrative of the fungicidal agents of this invention:

2-nitro-n-butyl acrylate _____ 112–114° C./ 18.0 mm. Hg.
2-nitro-n-butyl n-hexa-2,4-dienoate ____ 123–125° C./2.5 mm. Hg.
2-nitro-n-butyl cinnamate _____ 160–162° C./2.3 mm. Hg.
2-nitro-n-butyl n-but-2-enoate _____ 95–97° C./0.8 mm. Hg.
2-nitro-n-butyl propiolate _____ 90–92° C./0.6 mm. Hg.

The esters of this invention are useful in combatting a large variety of fungal organisms. They are particularly effective when applied directly to soil for controlling soil borne pathogenic fungi. To illustrate the fungicidal activity of the esters of this invention but not limitative thereof is the following.

An intimate mixture of 2 volumes of yellow corn meal and 3 volumes of white sand is infested with a particular pathogen (below itemized) and incubated for two weeks at 20° C. Then one volume of this infested mixture is blended uniformly with 3 volumes of a good grade of top soil which had been sterilized. To accomplish complete blending the composite of soil and infested mixture is passed through a No. 8 screen three times. A number of small cups are then tightly packed with 30 gram portions of the composite and the surface thereof leveled.

The ester to be evaluated (itemized below) is dissolved in sufficient acetone to make a 1% by weight solution and then diluted with water to provide a formulation having a concentration of 01% by weight. To provide the desired concentration in the aforedescribed composite the following further dilutions with water are made:

| Conc. desired in soil in p.p.m. | Ml. of 0.1% formulation | Ml. of water added to formulation |
|---|---|---|
| 30 | 1 | 3 |

The 4 ml. portions are drenched over the surface of the soil in each cup, care being taken to insure even distribution. The cups are then placed in a 100% humidity chamber at 70° F. for 44 hours. Upon removal from the chamber the amount of mycelial growth on the surface of the soil is noted and rated as follows:

1 = no growth
2 = growth from corn meal only
3 = some growth in soil away from corn meal particles
4 = surface covered but little aerial growth
5 = growth equivalent to that on untreated soil.

The results obtained with several of the esters of this invention and compared to a nitroalkyl formate are set forth below for each of the two indicated fungal organisms:

| Code Letter | Ester |
|---|---|
| A | 2-nitro-n-butyl palmitate. |
| B | 2-nitro-n-butyl isobutyrate. |
| C | 2-nitro-n-butyl n-heptanoate. |
| D | 2-nitro-n-butyl acrylate. |
| E | 2-nitro-n-butyl propionate. |
| F | 2-nitro-n-butyl acetate. |
| G | 2-nitro-n-butyl benzoate. |
| H | 2-nitroethyl propionate. |
| I | 2-nitroethyl n-hexanoate. |
| X | 2-nitro-n-butyl formate. |
| J | 2-nitro-n-butyl trimethylacetate. |

| Ester | Pythium ultimum at 30 p.p.m. | Rhizoctonia solani at 30 p.p.m. |
|---|---|---|
| A | 1 | 2 |
| B | 2 | 2 |
| C | 1 | 2 |
| D | 2 | 2 |
| E | 2 | 2 |
| F | 2 | 2 |
| G | 2 | 2 |
| H | 2 | 2 |
| I | 2 | 2 |
| J | 2 | 2 |
| X | 5 | 5 |

Although the novel fungicidal agents of this invention are useful per se in controlling a wide variety of fungal organisms, it is preferable that they be supplied to the organisms or to the environment of the organisms in a dispersed form in a suitable extending agent.

In the instant specification and appended claims it is to be understood that the term "dispersed" is used in its widest possible sense. When it is said that the fungicidal agents of this invention are dispersed, it means that the particles of the fungicidal agents of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal agents of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the fungicidal agents of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the fungicidal agents of this invention employed in combating or controlling fungal organisms can vary considerably provided the required dosage (i.e., toxic or lethal amount) thereof is supplied to the organisms or to the environment of the organisms. When the extending agent is a liquid or mixture of liquids (e.g. as in solutions, suspensions, emulsions, or aerosols) the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the fungicidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfonatable residue above about 80 percent and preferably above about 90 percent. In those instances wherein there may be concerned about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the fungicidal agents of this invention are to be supplied to the fungal organisms or to the environment of the organisms as aerosols, it is convenient to dissolve them in a suitable solvent and disperse the resulting solution in dichlorodifluoromethane or the chlorofluoroalkane which boils below room temperature at atmospheric pressure.

The fungicidal agents of this invention are preferably supplied to the fungal organisms or to the environment of the organisms in the form of emulsions or suspensions. Emulsions or suspensions are prepared by dispersing one or more fungicidal agents of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the fungicidal agents of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anion-active (or anionic), cation active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents," by John W. McCutcheon, and also in the July, August, September and October 1952 issues of Soap and Sanitary Chemicals under the title "Synthetic Detergents." The disclosures of these articles with respect to surfactants, i.e. the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The fungicidal agents of this invention can be dispersed by suitable methods (e.g., tumbling or grinding) in solid extending agents either of organic or inorganic nature and supplied to the fungal organism's environment in particulate form. Such solid materials include for example, tricalcium phosphate, calcium carbonate, kaolin, bole, kieselguhr, talc, bentonite, fuller's earth, pyrophillite diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for fungicidal purposes in the dry form, or, by addition of water-soluble surfactants or wetting agents the dry particulate solids can be rendered wettable by water so as to obtain stable aqueous dispersions or suspensions suitable for use as sprays.

For special purposes the fungicidal agents of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting fungal organisms or they can be provided in a concentrated form suitable for mixing with or dispersing in other extending agents. As illustrative of a particularly useful concentrate is an intimate mixture of one or more fungicidal agents of this invention with a water-soluble surfactant which lowers the surface tension of water in the weight proportions of 0.1 to 15 parts of surfactant with sufficient of the fungicidal agent of this invention to make 100 parts by weight. Such a concentrate is particularly adapted to be made into a spray for combatting various forms of fungal organisms by the addition of water thereto. As illustrative of such a concentrate is an intimate mixture of 95 parts by weight of 2-nitro-n-butyl propionate or 2-nitro-n-butyl palmitate and 5 parts by weight of a water-soluble non-ionic surfactant such as the polyoxyethylene derivative of sorbitan monolaurate.

Another useful concentrate adapted to be made into a spray for combatting fungal organisms is a solution (preferably as concentrated as possible) of one or more fungicidal agents of this invention in an organic solvent therefor. The said liquid concentrate preferably contains dissolved therein a minor amount (e.g., 0.5 to 10 percent by weight of the weight of the new fungicidal agent) of a surfactant (or emulsifying agent), which surfactant is also water-soluble. As illustrative of such a concentrate is a solution of 2-nitro-n-butyl propionate or 2-nitro-n-butyl palmitate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for fungicidal purposes, the active ingredients can be one or more of the compounds of this invention. The compounds of this invention can also be advantageously employed in combination with other pesticides, including, for example, insecticides, nematocides, bacterocides, and herbicides. In this manner it is possible to obtain mixtures which are effective against a wide variety of pests and other forms of noxious life.

In controlling or combatting fungal organisms the fungicidal agents of this invention either per se or compositions comprising same are supplied to the fungal organisms or to their environment in a lethal or toxic amount. This can be done by dispersing the new fungicidal agent or fungicidal composition comprising same in, on or over an infested environment or in, on or over an environment the fungal organisms frequent, e.g. agricultural soil or other growth media or other media infested with the fungal organisms or attractable to the organisms for habitational or sustenance or propagational purposes, in any conventional fashion which permits contact between the organisms and the fungicidal agents of this invention. Such dispersing can be brought about by applying the fungicidal agent per se or sprays or particulate solid compositions containing same to a surface infested with the fungal organisms or attractable to the organisms, as for example, the surface of agricultural soil or other media such as the above ground surface of plants by any of the conventional methods, e.g. power dusters, boom and hand sprayers, and spray dusters. Also for sub-surface application such dispersing can be carried out by simply mixing the new fungicidal agent per se or fungicidal spray or particulate solid compositions comprising same with the infested environment or with the environment the fungal organisms frequent, or by employing a liquid carrier for the new fungicidal agent to accomplish sub-surface penetration and impregnation therein.

What is claimed is:

1. The method which comprises applying to fungal organisms in their horticultural habitats a fungicidally toxic amount of at least one ester of the formula $$R-\overset{O}{\underset{\|}{C}}-O-Z$$

wherein R is a hydrocarbon containing 1 to 17 carbon atoms and wherein Z is nitro substituted alkyl containing 2 to 6 carbon atoms the nitro substituent of which being attached to a carbon atom at least one carbon atom removed from the carbonyloxy group.

2. The method which comprises applying to fungal organisms in their horticultural habitats a fungicidally toxic amount of at least one ester of the formula $$R-\overset{O}{\underset{\|}{C}}-O-Z$$

wherein R is primary alkyl of the empirical formula $H(C_mH_{2m})-CH_2-$ wherein $m$ is an integer from 0 to 16, inclusive, and wherein Z is nitro substituted alkyl of the formula $$-CH_2-CH-(CH_2)_nH$$
$$\underset{NO_2}{|}$$

wherein $n$ is an integer from 0 to 3, inclusive.

3. The method which comprises applying to soil for control of soil borne pathogenic fungal organisms a fungicidally toxic amount of at least one ester of the formula $$R-\overset{O}{\underset{\|}{C}}-O-CH_2-CH-(CH_2)_nH$$
$$\underset{NO_2}{|}$$

wherein $n$ is an integer from 0 to 3, inclusive, and wherein R is straight chain primary alkyl of the empirical formula $H(CH_2)_x-$ wherein $x$ is a whole number from 1 to 17.

4. The method of claim 3 wherein the ester toxicant is 2-nitro-n-butyl palmitate.

5. The method of claim 3 wherein the ester toxicant is 2-nitro-n-butyl propionate.

6. The method of claim 3 wherein the ester toxicant is 2-nitro-n-butyl acetate.

7. The method of claim 3 wherein the ester toxicant is 2-nitro-n-butyl n-heptanoate.

8. The method which comprises applying to soil for control of soil borne pathogenic fungal organisms a fungicidally toxic amount of at least one ester of the formula $$R''-\overset{R'}{\underset{R'''}{\overset{|}{C}}}-\overset{O}{\underset{\|}{C}}-O-CH_2-CH-(CH_2)_nH$$
$$\underset{NO_2}{|}$$

wherein $n$ is an integer from 0 to 3, inclusive, and wherein R', R'' and R''' are alkyl containing 1 to 3 carbon atoms.

9. The method of claim 8 wherein the ester toxicant is 2-nitro-n-butyl trimethylacetate.

References Cited in the file of this patent
UNITED STATES PATENTS
2,976,244    Bennett _____ Mar. 21, 1961